US006817689B1

(12) United States Patent
Annacone

(10) Patent No.: US 6,817,689 B1
(45) Date of Patent: Nov. 16, 2004

(54) CURRENCY BILL HAVING ETCHED BILL SPECIFIC METALLIZATION

(75) Inventor: William Annacone, Stowe, VT (US)

(73) Assignee: T.S.D. LLC, Sebastian, FL (US)

( * ) Notice: Subject to any disclaimer, the term of this patent is extended or adjusted under 35 U.S.C. 154(b) by 0 days.

(21) Appl. No.: 10/629,994

(22) Filed: Jul. 30, 2003

Related U.S. Application Data

(62) Division of application No. 10/368,287, filed on Feb. 18, 2003.

(51) Int. Cl.[7] ..... B41J 3/00; B41J 2/01; G09F 3/00; B42D 15/00; G09C 3/00

(52) U.S. Cl. ..... 347/2; 347/107; 283/72; 283/73; 283/74; 283/83; 283/91; 283/901

(58) Field of Search ..... 235/437, 494; 283/57, 58, 59, 70, 72, 74, 77, 85, 91, 901, 902, 903, 904, 73, 83; 347/2, 74, 107

(56) References Cited

U.S. PATENT DOCUMENTS

| | | | | | |
|---|---|---|---|---|---|
| 4,398,994 | A | | 8/1983 | Beckett | 156/659.1 |
| 4,552,614 | A | | 11/1985 | Beckett | 156/640 |
| 4,584,590 | A | | 4/1986 | Fischbeck et al. | 346/140 |
| 4,610,755 | A | | 9/1986 | Beckett | 156/634 |
| 4,685,997 | A | | 8/1987 | Beckett | 156/629 |
| 4,845,517 | A | | 7/1989 | Temple et al. | 346/140 R |
| 4,879,568 | A | | 11/1989 | Bartky et al. | 346/140 R |
| 4,959,120 | A | | 9/1990 | Wilson | 156/651 |
| 5,155,498 | A | | 10/1992 | Roy et al. | 346/1.1 |
| 5,266,386 | A | | 11/1993 | Beckett | 428/209 |
| 5,273,575 | A | | 12/1993 | de Saint Romain | 106/23 B |
| 5,281,474 | A | | 1/1994 | Matsuzaki et al. | 428/349 |
| 5,340,436 | A | | 8/1994 | Beckett | 156/639 |
| 5,381,162 | A | | 1/1995 | Roy et al. | 347/10 |
| 5,406,318 | A | | 4/1995 | Moore et al. | 347/70 |
| 5,543,009 | A | | 8/1996 | Hayes | 156/268 |
| 5,628,921 | A | | 5/1997 | Beckett | 216/91 |
| 5,729,365 | A | * | 3/1998 | Sweatt | 359/2 |
| 6,071,483 | A | | 6/2000 | Pastore | 422/255 |
| 6,196,662 | B1 | | 3/2001 | Voelker et al. | 347/40 |
| 6,218,004 | B1 | | 4/2001 | Shaw et al. | 428/336 |
| 6,491,385 | B2 | | 12/2002 | Anagnostopoulos et al. | 347/73 |
| 6,506,315 | B2 | * | 1/2003 | Ferro | 216/100 |
| 6,565,173 | B1 | | 5/2003 | Murcia et al. | 347/9 |
| 2002/0051039 | A1 | | 5/2002 | Moynihan et al. | 347/68 |
| 2002/0067391 | A1 | | 6/2002 | Anagnostopoulos et al. | 347/40 |
| 2002/0080373 | A1 | | 6/2002 | Collette et al. | 358/1.9 |
| 2002/0117845 | A1 | | 8/2002 | Ahlers et al. | 283/72 |
| 2003/0035938 | A1 | | 2/2003 | Lai | 428/209 |

* cited by examiner

*Primary Examiner*—Stephen D Meier
*Assistant Examiner*—Alfred Dudding
(74) *Attorney, Agent, or Firm*—Allen, Dyer, Doppelt, Milbrath & Gilchrist, P.A.

(57) ABSTRACT

The system and method of the present invention forms an item specific pattern on a plain or holographic metallized film or hot stamp foil, including an embossed substrate with or without holograms. An ink jet printhead includes a plurality of ink jet channels and respective ink jets that receive one of etchant or etchant-resistant mask material for ejecting etchant or etchant-resistant mask material through the respective ink jets onto a metallized surface of the metallized film or hot stamp foil. A controller individually and digitally controls the ejection of etchant or etchant-resistant mask material in a programmed manner for ink jet printing on the metallized surface a unique pattern of etchant or etchant-resistant mask. Etchant etches the metallized surface into an item specific pattern by the ink jet printed etchant or subsequently applied etchant that exposes the metallized surface devoid of the etchant-resistant mask.

21 Claims, 5 Drawing Sheets

CURRENCY BILL HAVING ETCHED BILL SPECIFIC METALLIZATION

This application is a division of Ser. No. 10/368,287 filed Feb. 18, 2003.

FIELD OF THE INVENTION

This invention relates to forming decorative patterns on metallized film, and more particularly, this invention relates to a system and method for forming a pattern on metallized film, such as including plain or holographic metallized films and hot stamp foils, including embossed substrates with or without holograms.

BACKGROUND OF THE INVENTION

Decorative packaging, currency bills, labels, containers and many other objects used in different applications often display a repetitive pattern on metallized film, often formed as a polymer base layer and a metallized surface, such as copper or aluminum.

Some of these applications include a colored, metallic foil that is hot stamped, in place of ink, onto a substrate or melted onto a print substrate. For example, a hot stamp printing plate could be cast or engraved into a piece of metal and held by a heated fixture. Between the plate and substrate, a hot stamp "foil" (film) with a color or metal transfer ink coated in a thin layer is compressed onto the substrate to transfer the image. The printers could be flatbed platen units, rotary, units, or automatic web feed presses. It is also possible that holograms and/or diffractive images are added for enhanced security.

The use of enhanced security, hot stamp foils for authentication is becoming increasingly popular and is evident when one views many currency bills used in Europe and other countries. The enhanced security hot stamp foils often incorporate a hologram or other optical device, such as a diffraction grating or pattern or a kinegram. These devices allow enhanced protection and authenticity of various documents or plastic cards. Different substances can be used, including PVC, coated papers, textured security or bank note papers, packaging films, textiles, thermosensitive papers, and other similar substrates.

It is also possible to use not only foil stamping methods, but also use embossing techniques with the substrates. For example, a metal plate with a specific image is created and pressed onto the substrate leaving behind an image. This process is different from foil stamping where the image is transferred rather than pressed. Sometimes a holographic "patch" can be created by embossing a hologram onto a hot stamped foil, or a narrow strip hologram can be made from hot stamped foil and applied to a document.

In one process, a printer hot stamps blank foil onto a document and creates a hologram by embossing a holographic image onto blank foil. The holograms can be embossed in-line using a blank foil or embossable substrate. One station could hot stamp chemicals onto the substrate and another station could emboss the image in foil. It is possible to surface coat a substrate with silver and chemicals to make holograms in-line such that hot stamping may not be required when using an embossable substrate.

In one prior art technique, the base layer of a hologram is created by hot stamping foil on a substrate using a rotating, heated, stamping cylinder and associated base roller. The substrate and foil pass between the cylinder and roller. The cylinder includes a raised pad to configure the holographic image. It is also possible to emboss by using a holographic printing place (as a shim), and a rotating, heated, embossing cylinder and rubber-coated base roller. The applied foil with the substrate passes between the cylinder and roller and a raised pad, which is larger in size than the hot stamping pad, comes into contact with the foil to create the holographic image. Demetallization is often used to add further security and design with different levels of transparency.

Holograms are advantageously used because they combat counterfeiting and cannot be copied easily using a photocopier. They are also difficult to scan digitally using computer equipment. Holograms allow validation, especially with hidden and embedded holographic images. It is also possible to use a "kinegram" image, such as formed from fine lines of different thicknesses and shapes on a metallized foil. As the angle of light changes, the image of the kinegram also changes, producing the effect of a moving picture that could enhance security.

In one common prior art demetallization system used with packaging, a web of metallized polymer film is printed with a repetitive pattern of etchant-resistant material that has been applied from a gravure roll, corresponding to the pattern desired to be produced on the metallized surface, typically an aluminized or copper surface. An aqueous sodium hydroxide (NaOH) solution having a concentration of up to 25% by weight (NaOH) is applied at a temperature from about 15° to about 100° C. across the web to contact and etch those areas of the metallized surface that are free of the etchant resistant material. This sodium hydroxide (NaOH) solution remains in contact with the web for about 0.1 to about 10 seconds, depending on the thickness and metal used in the metallized surface to permit the sodium hydroxide to dissolve the aluminum from those areas of the web not having the etchant-resistant material. The material then is washed to remove any excess etchant and etchant by-products.

Usually this type of system uses rollers that feed the web and dips the web into baths of liquid to effect the various steps. Some prior art improvements spray an etchant onto the film. Scrapers remove any etched material. These steps are usually followed by warm water sprays to wash any etchant from the film surface. Afterward, the washed film is hot air dried and chill-roll cooled.

In other prior art systems, a substrate film is printed with a pattern of water-based printing varnish having an etchant dissolved therein, which remains in contact with the metallized surface for a time sufficient to etch the pattern onto the metallized surface. Any excess etchant is washed from the film and dried.

Another improvement has a patterned laminate formed by printing an image of an etchant by gravure roller on a web and laminating the printed web with another web such that the image is sandwiched between the webs in contact with the metallized film. The etchant dissolves the metallized surface in the printed areas to provide a desired pattern. The resulting laminate may be used as a packaging material. Further prior art improvements include selectively demetallizing film in different areas to form a graduated optical density for decorative packaging or even security purposes.

One drawback of many prior art demetallization and pattern forming systems is the repetitive pattern that is consistently applied onto the metallized surface. In decorative packaging, this is acceptable. In other instances, such as the holographic metallized film where security is an issue, it is not acceptable. For example, it may be desirable to form a unique metallized pattern on currency bills or identifying labels instead of the prior art repetitive pattern that is typically applied to some currency bills, and areas of decorative packaging, labels, containers and other items.

It would be advantageous if a demetallization pattern could be uniquely applied by a system and method where a unique and item specific (such as currency bill specific) pattern could be applied individually to successively produced items, such as currency bills, labels, containers and similar items. This pattern could be in a microscopic or macroscopic pattern.

SUMMARY OF THE INVENTION

It is therefore an object of the present invention to provide an improved system and method for forming a pattern on plain or holographic metallized film and hot stamp foil, including embossed substrates with or without holograms, which overcomes the disadvantages of the prior art.

It is yet another object of the present invention to provide a system and method that forms an item specific pattern on plain or holographic metallized film and hot stamp foil, enhancing security and identification on currency bills, labels, containers and similar items.

The present invention advantageously provides a system and method for forming an item specific pattern on a metallized surface of plain or holographic metallized film or hot stamp foil, including embossed substrates. The metallized surface is etched into an item specific pattern that can be unique or repetitive, no matter the application or item, such as a currency bill, label, container or similar items.

The system and method of the present invention individually and digitally controls ejection of ink having one of an etchant or etchant-resistant mask material from an ink jet printhead. Control can be performed adequately by a programmable logic controller (PLC) operatively connected to the ink jet printhead, for individually and digitally controlling ejection of the ink and etchant therein through respective ink jets in a programmed and controlled manner. The present invention permits ink jet printing onto a metallized surface with an item specific pattern of ink. When etchant is included with ink, the etchant etches the metallized surface into an item specific pattern. When an etchant-resistant mask is applied, a subsequent etchant is applied, etching those areas not covered by the mask. By digitally controlling the printing of ink with the etchant or etchant-resistant mask material through the ink jet printhead, individual, customized metallized patterns that are item specific can be applied to each article or item, such as a currency bill, label or container. The item specific pattern not only could act as an enhanced security feature, but also could act as an identifying indicia for tracing a currency bill via the pattern.

In one aspect of the present invention, an item specific pattern is etched into a metallized film having a polymer base layer and metallized surface such as an aluminized surface. An ink jet printhead has the plurality of ink jet channels and respective ink jets that receive ink having an etchant or etchant-resistant mask material therein and ejects ink through respective ink jets onto the metallized surface. A controller is operatively connected to the ink jet printhead and individually and digitally controls ejection of ink, such as etchant or etchant-resistant mask material, through the respective ink jets in a programmed, controlled manner for ink jet printing on the metallized surface a pattern of etchant or etchant-resistant mask such that if an etchant, it etches the metallized surface into an item specific pattern that is individual to an item, such as a currency bill, label or container. If an etchant-resistant mask is applied, an etchant is subsequently applied, such as by an etchant bath, for etching those areas that are not covered by an etchant into the surface relief pattern.

A film advancing mechanism advances a plain or holographic metallized film or hot stamp foil along a predetermined path of travel into a demetallization station where the ink jet printhead is located. In one aspect, an ink reservoir holds an ink that includes an etchant or etchant-resistant mask material. The ink reservoir can be an integral part of the ink jet printhead, mounted adjacent the ink jet printhead, or mounted separate as a large ink reservoir or container holding ink and one of etchant or etchant-resistant mask material. Ink is delivered to a smaller reservoir mounted at the ink jet printhead. A washer can be located along this predetermined path of travel for washing excess ink and etchant from the metallized surface after the pattern has been etched on the metallized film.

A printhead mounting assembly can mount the ink jet printhead for angled movement relative to the metallized surface of the plain or holographic metallized film or hot stamp foil for changing the resolution of the ink applied in a pattern based on the angle of the ink jet printhead. In another aspect of the present invention, the ink jet printhead can be a Drop On Demand (DOD) printhead, such as a piezoelectric ink jet printhead. It could also be a Continuous Ink Jet printhead (CIJ).

The system includes a controller, such as a programmable logic controller (PLC), mounted on appropriate boards for implementing the logic and programming necessary to form an item specific pattern for use with currency bills, labels, containers and the like. When the metallized surface is aluminum, the etchant could be a base or acid, and could be sodium hydroxide (NaOH) or a combination of similar etchants.

In another aspect of the present invention, a currency bill, formed from a substrate such as paper, has a metallization layer that has been etched into an item specific (in this increase bill specific) pattern by the system and method of the present invention. The patterned metallization is adhesively applied over a portion of the surface of the currency substrate. A protective layer is applied over the patterned layer.

In another aspect of the present invention, the currency bill is formed from a paper or other substrate. It can be formed by applying a release layer onto a polymer film and applying a substantially translucent protective coating over the release layer. This protective coating is metallized to form a metallized surface on the protective coating. A portion of the metallized surface is etched to form an item (or currency bill) specific pattern by supplying ink having an etchant or etchant-resistant mask material to an ink jet printhead. The metallized surface is ink jet printed with the desired pattern of ink having one of etchant or etchant-resistant mask material (followed by etching) for etching the metallized surface into an item specific pattern.

An adhesive is applied onto the patterned surface and the substrate engaged with the adhesive such that the release layer is broken and the protective coating and metallized layer having the item specific pattern is adhesively applied onto the substrate. The substrate could be a flexible paper member, such as a currency bill. The heat could be activated by applying heat to the adhesive.

A method aspect of the invention is also set forth for forming a pattern in a plain or holographic metallized film or hot stamp foil having metallized surface by supplying ink with an etchant or etchant-resistant mask material from an ink reservoir to an ink jet printhead having a plurality of ink jet channels and respective ink jets, each individually and digitally controlled by a controller. Ink is ejected through respective ink jets in a programmed manner. The method further comprises the step of controllably ink jet printing on the metallized surface a pattern of ink for etching either with the ink jet printed etchant or an etchant following printing of the etchant-resistant mask, the metallized surface into an item specific pattern.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
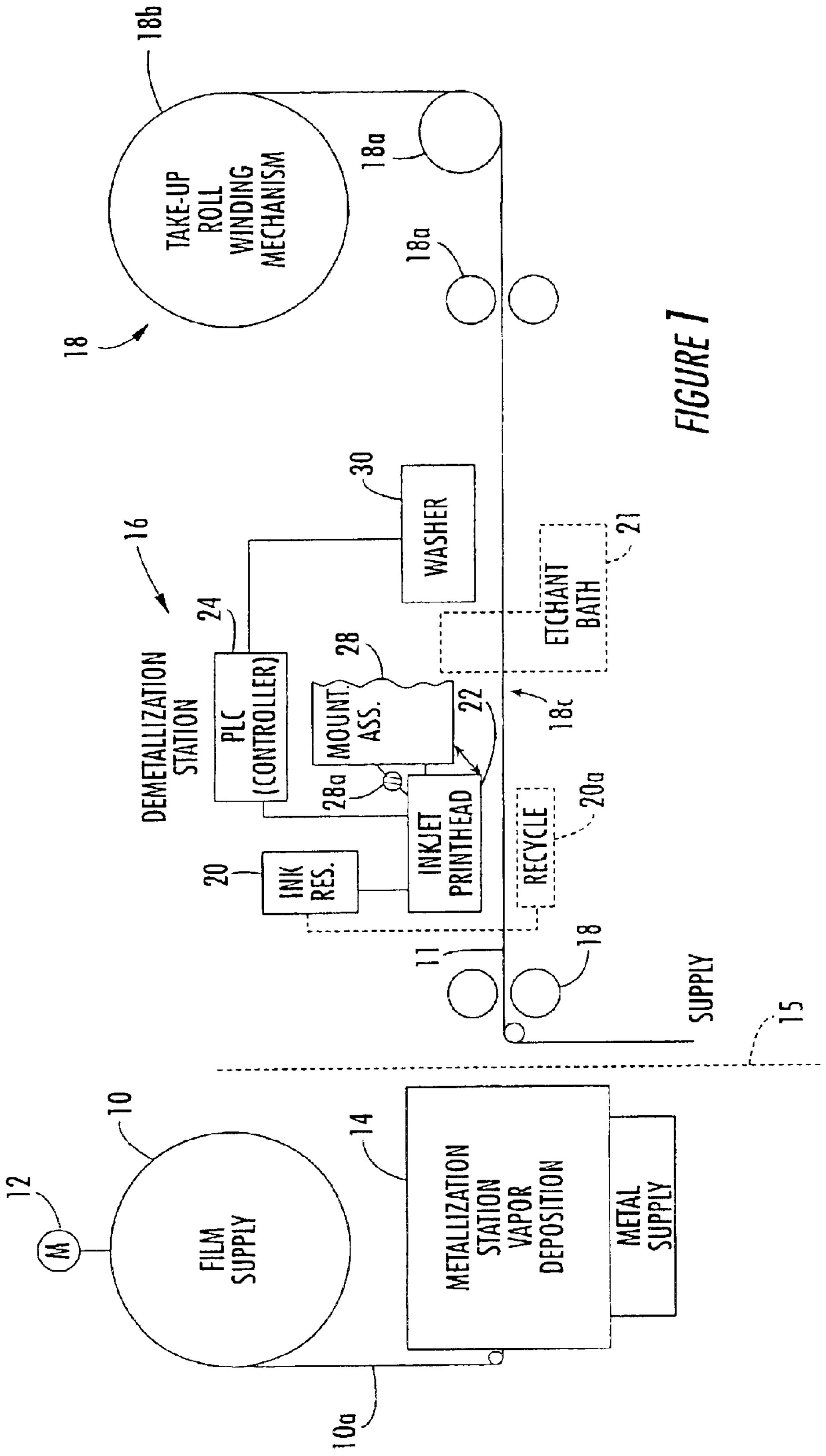
FIG. 1 is a block diagram showing basic elements used in the system and method of the present invention that etches an item specific pattern on plain or holographic metallized film or hot stamp foil, including embossed substrates.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously forms a unique, selective and item specific pattern on a metallized surface formed as a plain or holographic metallic film or hot stamp foil, including embossed substrates. The pattern could be a microscopic or macroscopic pattern, including a surface relief pattern. The metallic surface is demetallized (etched) into an item specific pattern for use with any number of different items, such as currency bills, labels, containers or similar items. The plain or holographic metallized film or hot stamp foil typically is formed with one or more polymer layers and metallized surface, such as formed from vapor deposition of aluminum or copper.

It should be understood that throughout this description, the use of the term "plain or holographic metallized film and hot stamp foil" includes the many different types of metallized film, hot stamped foils, embossed substrates with or without holograms, and other materials that could include plain or holographic images, kinegrams and other similar authentication, security and similar devices and metallized surfaces, and formed by techniques known to those skilled in the art. Different substrates could include PVC, coated papers, textured security or bank note papers, textiles, packaging films, thermosensitive papers, cardboard and packaging container material, and other similar substrate materials. Different techniques can be used, including foil stamping and embossing techniques. Demetallization is used to add further security and design with different levels of transparency. Hidden embedded holographic images and kinegrams are used with the present invention.

In the present invention, an ink jet printhead has a plurality of ink jet channels and respective ink jets that receive ink having one of an etchant or etchant-resistant mask material within the ink jet channels and respective ink jets. The printhead ejects ink through respective ink jets onto the metallized surface. A controller is operatively connected to the ink jet printhead and digitally controls the ejection of ink through the respective ink jets in a programmed, controlled manner for ink jet printing on the metallized surface a unique and desired, item specific ink pattern such that any etchant with ink etches the metallized surface into the item specific pattern or a subsequently added etchant etches those areas not covered by the etchant-resistant mask to form the item specific pattern. Naturally, it should be understood that the item specific pattern could be repetitive.

FIG. 1 illustrates a general block diagram overview of the process and system of the present invention. A film supply 10 is usually formed as a roll of polymer base layer film 10*a* that is mounted on an unwinding mechanism 12 that could be motor controlled for back pressure or unwinding, or includes a back pressure spring mechanism or other means known to those skilled in the art. The polymer base layer film 10*a* could be a polymer base that forms the "lower" or base layer (with other layers as desired) for the metallized film. It can be formed from a polymer material such as a polyester™ (PET) material, for example sold under the trademark "mylar," or other materials known to those skilled in the art.

This base layer film 10*a* should be resistant to etchants used for etching the metallized surface that is later applied onto the film. The base layer film 10*a* is fed into a metallization station 14 where a metallized surface 10*b* is applied onto the film 10*a* such as improving the film through a vapor deposition chamber and vapor deposting aluminum, copper or other metallic material in a layer ranging from about 10 to about 1,000 angstroms, preferably from about 200 to about 400 angstroms, and typically on the average of about 300 angstroms. The polymer film used as a base layer 10*a* could vary in thickness from as little as about 5 to as much as about 100 microns, and preferably between about 10 to about 50 microns.

Although a polyester film has been described as an adequate material for use as a polymer base layer film, other polymer film materials can be used, including polyethylene, polypropylene, polystyrene, polyvinyl chloride and polycarbonate. The metallized film or hot stamp foil is formed "off-site" or in another area of processing and could be shipped as a wound roll directly to a processing line for demetallization, in accordance with the present invention, as indicated by the broken dashed lines 15 in the processing line shown in FIG. 1.

After the metallized film 11 is formed off-site and transferred to demetallization areas, it is advanced by a film advancing mechanism 18 along a predetermined path of travel into the demetallization station 16. The film advancing mechanism 18 can be any mechanism for pulling or advancing film, including guide rollers 18*a,* winding mechanisms 18*b,* and other means known to those skilled in the art for advancing the metallized film along a predetermined path of travel 18*c* into the demetallization station 16.

At the demetallization station 16, an ink reservoir 20 holds an ink that includes one of an etchant or etchant-resistant mask. Throughout this description, the term "ink" is given a broad definition to mean a fluid that can be controllably ejected from an ink jet printer as explained below. The ink could be translucent. The ink could be a printing varnish having the etchant or etchant-resistant mask material dissolved therein. Although the ink reservoir 20 is shown positioned at the demetallization station 16, a large reservoir of ink and etchant or etchant-resistant mask material could be located separate from the demetallization station and the ink and etchant or etchant-resistant mask material pumped into the demetallization station. As illustrated, an ink jet printhead 22 is located at the demetallization station.

Figure 2:
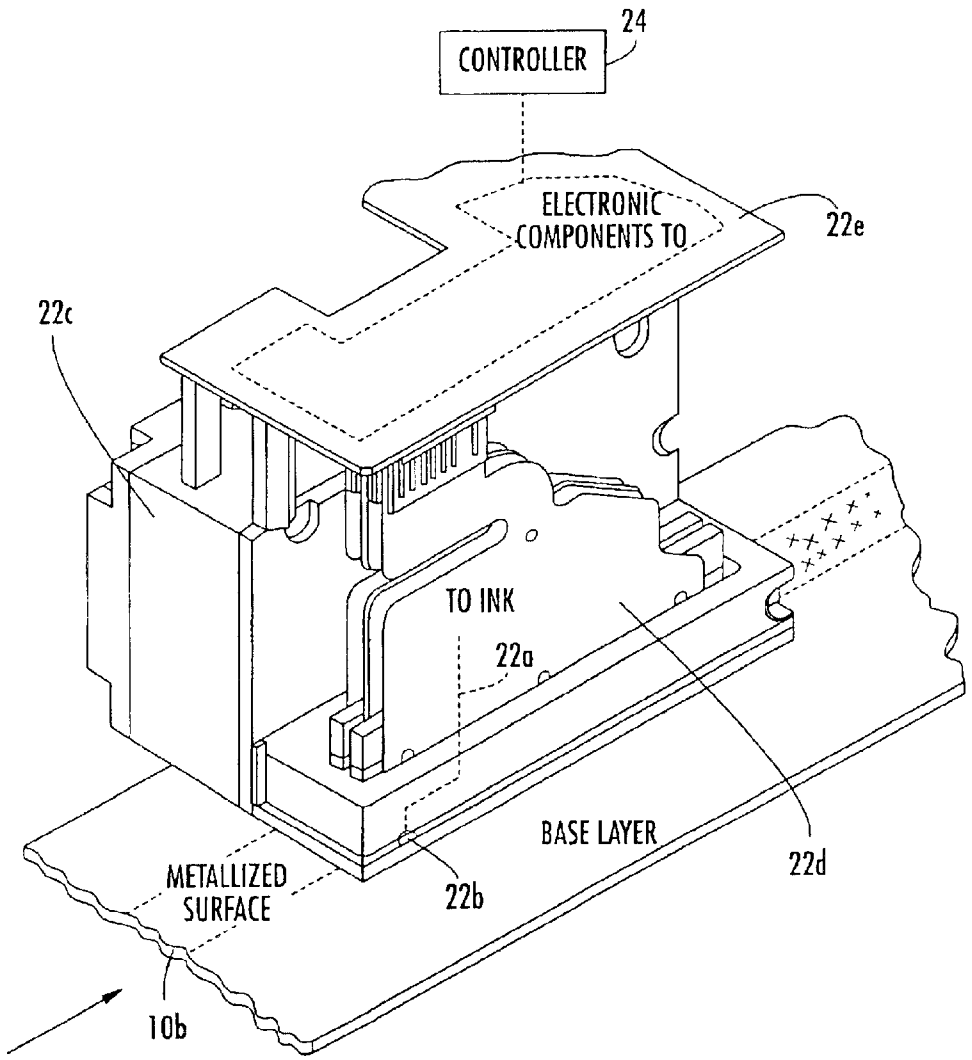
FIG. 2 is a fragmentary, isometric view of an example of a piezoelectric ink jet printhead that can be used in the present invention.

FIG. 2 shows one example of an ink jet printhead 22 that can be used by the present invention. This ink jet printhead is formed as a piezoelectric Drop On Demand (DOD) ink jet printhead and has a plurality of ink jet channels 22*a* and respective ink jets 22*b* (shown generally by only one dashed line) that receive the ink and etchant or etchant-resistant mask material within the ink jet channels and respective ink jets for ejecting the ink through respective ink jets 22*b* onto the metallized surface 10*b*. A controller 24, such as a programmable logic controller, is operatively connected to the ink jet printhead 22 and individually and digitally controls ejection of ink through respective ink jets 22*b* in a programmed manner for ink jet printing on the metallized surface 10*b* an item specific pattern 26 of ink. The etchant etches the metallized surface into the item specific pattern through either the etchant as part of the ink (or forming the ink) or by means of passing through an etchant bath 21, as one non-limiting example, if an etchant-resistant mask has been ink jet printed onto the metallized surface.

Many different types of ink could be used in the present invention. For example, a low viscosity, ultraviolet curable ink could be used. A low viscosity solvent based ink having organic or inorganic solvents could be used. The solvents could include a solvent such as toluene, ethanol, methanol, or isopropyl or other similar solvents. The ink could also be a water based ink having a pH of about 5 to about 9. In some cases, a hot melt ink could also be used. The ink should not be particularly damaged by an etchant.

Although the type of etchant can vary depending on the type of metal applied on a polymer base layer 10*a* to form the metallized film 11, an acid or base etchant is possible with aluminum, although typically, sodium hydroxide (NaOH) has been used as an etchant on an aluminized surface forming a metallized layer 10*b*. Usually, any sodium hydroxide should be at a temperature of about 50° C. to about 95° C. and can be in a range from about 1% to about 50% weight in the ink and preferably around 5% to about 10% in some non-limiting examples. The amount of etchant, of course, depends on the type and thickness of any metallization layer, any polymer layers, the use and design of holograms, processing speeds, and other factors. The etchant could be stored with the ink as part of the ink reservoir 20, or as a separate unit contained in an ink reservoir on the ink jet printhead. Many etchant-resistant masks can possibly be used. The etchant bath 21 for subsequently applying etchant to the areas not covered by the mask would contain the proper etchant. Such etchant resistant materials have been used by those skilled in the art, for example as described in U.S. Pat. No. 4,398,994 to Beckett.

The type of ink jet printheads 22 used in the present invention can vary and could include a Drop On Demand ink jet printhead, such as the piezoelectric ink jet printhead shown in FIG. 2, or a Continuous Ink Jet printhead (CIJ). A Drop On Demand (DOD) ink jet printheads could also include a pressurized container of ink and etchant or etchant-resistant mask and an ink pump where ink (with the etchant or etchant-resistant mask) passes through a filter and traps particles. The ink could be distributed to a valve and plunger assembly in the printhead. A manifold could distribute ink to individual solenoid valves controlled by high speed, timed electrical pulses that are usually generated by a programmable logic controller or similar controller. Valves would open and close and a measured drop of ink (and etchant or etchant-resistant mask) would be delivered through a small tube and out of a nozzle onto the metallized surface. With Continuous Ink Jet printing, ink droplets are constantly emitted and an electrical field deflection plate could control those droplets that are allowed to reach any part of the metallized surface. Unused ink droplets could be deflected into a recycling reservoir 20*a* (FIG. 1) and mixed with any other fluids and distributed to the system again.

FIG. 2 is a non-limiting example of a piezoelectric ink jet printhead that can be used in the present invention such as manufactured by Spectra of Lebanon, N.H. This type of technology can use many jet actuators with a single or small number of flat pieces of piezoelectric material. Typically, a piezoelectric material is poled by applying a strong electric field that is removed, while orienting the field with an initial electric field. A weaker electric field could be applied parallel to the poling field such that the piezoelectric material reacts in an extension mode and lengthens in one dimension, but shortens in the other. When the electric field is perpendicular to the poling field, the piezoelectric material could react in a shear mode, similar to a deck of cards that "shear" in one direction, but have no change in the other direction. Electrodes can be placed on the surface of the piezoelectric material and a section of the material moved without affecting any surrounding material. A voltage could be applied to a center electrode and an electric field created between the center electrode and ground electrodes to create a shear response. When this material is applied to a pumping chamber that communicates with the nozzle, an ink drop can be formed. The piezoelectric material moves only about 0.000001 inch. It is also possible to use a channel where saturated ink with air could be degassed for dissolving air bubbles.

FIG. 2 illustrates a printhead reservoir 22*c* that is mounted adjacent a jetting assembly 22*d* of the printhead 22. In this example, two piezoelectric slices form 120 ink jets are aligned with another pair of piezoelectric slices to form a total of about 256 jets. A head interface board 22*e* could be mounted at an upper portion of the printhead and used for interfacing with the controller 24.

The piezoelectric materials could be a lead-zirconate, titanate (PZT) combination forming a PZT transducer. The electric field applied to a poled PZT combination changes the shape of the crystalline structure. Preferably the PZT transducer in a printhead is pulled in a thickness direction first. Usually the outside layer of a jet array module includes a flex circuit that connects to electrodes on surfaces of piezoelectric transducers and provide electrical drive signals. The transducer could be mounted to a cavity plate and an array body to form pressure chambers. Serial-to-parallel converters could select those jets to fire either simultaneously or individually as controlled by the programmable logic controller. Some complicated image data for forming very complicated, item specific patterns could be daisy-chained into a serial stream using the head interface board and have controlled slew rates.

It is also possible to angle the ink jet printhead 22 for angled movement relative to the metallized surface 10*b* of the metallized film 11 for changing the resolution of the applied ink/etchant or etchant-resistant mask material and as a result, change the resolution of the final and etched item specific pattern based on the angle of the ink jet printhead 22. An ink jet mounting assembly 28 (FIG. 1) could mount the ink jet for angled movement. An appropriate servomotor 28*a* operative from the controller 24 could change angle as desired.

It is possible also to use ceramic ink jet components on the ink jet printhead to withstand the effects of any etchants. Some ink jet printhead members could be made of carbon and provide heat and ink etchant resistant passages. This would also be particularly advantageous for hot melt ink jet printheads that operate at elevated temperatures as required with some etchants.

Once the desired pattern of ink and etchant or etchant-resistant mask material has been applied onto the metallized surface 10*b,* the metallized film 11 can be washed at a washer 30 where water could be applied or other washing fluid for removing any excess ink and etchant or for performing other washing functions to the metallized film 11.

Figure 3:
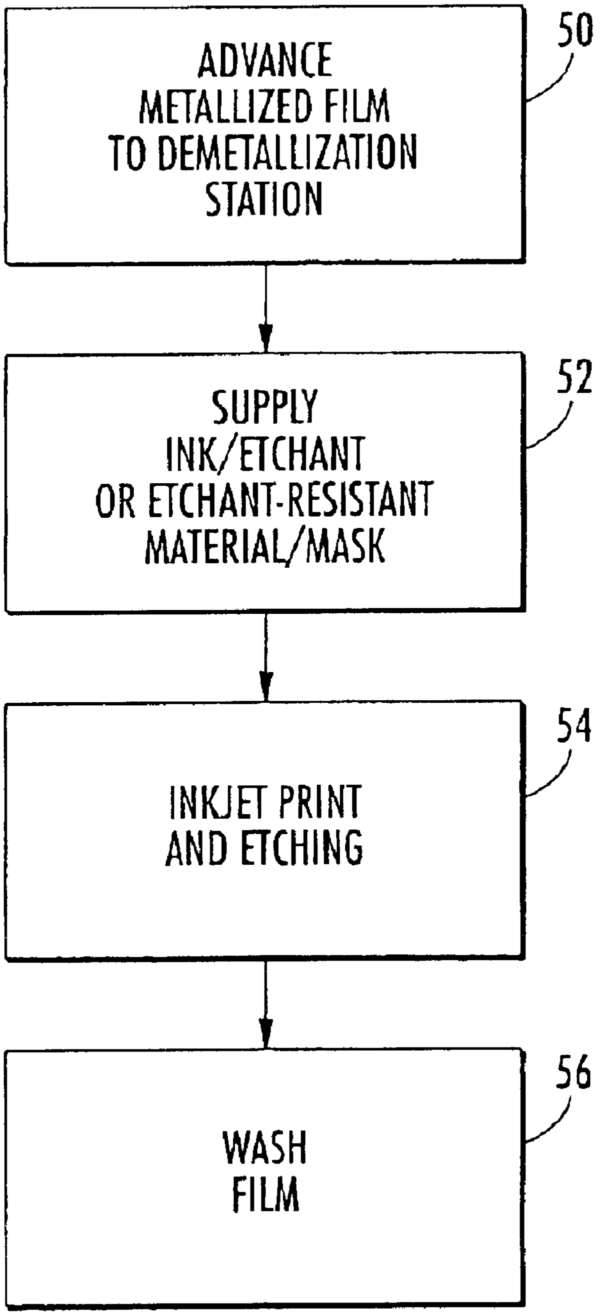
FIG. 3 is a flow chart illustrating an example of basic steps that can be used by the method of the present invention.

FIG. 3 illustrates a basic flow chart illustrating the method of the present invention for forming an item specific pattern on metallized film having a metallized surface. A metallized film comprising a base layer, such as a polymer layer and metallized surface, is advanced into a demetallization station (block 50). Ink is supplied with an etchant or etchant-resistant mask material from an ink reservoir to an ink jet printhead (block 52) located at a demetallization station. The metallized surface is ink jet printed at the demetallization station with a pattern of ink and etchant or etchant-resistant mask material for etching the metallized surface either by the ink/etchant or subsequent application of etchant over the etchant-resistant mask to form the item specific pattern (block 54). The plain or holographic metallized film or hot stamp foil having the item specific pattern is subsequently washed (block 56).

Figure 6:
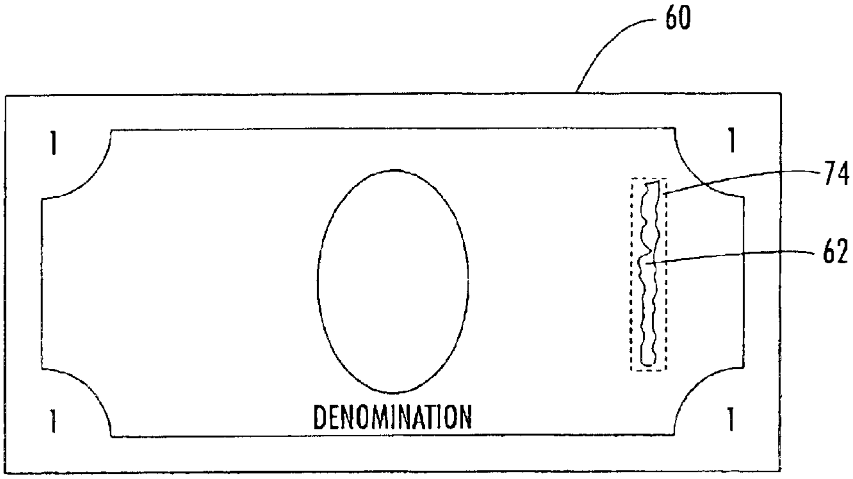
FIG. 6 is a fragmentary plan view of a currency bill having a metallized pattern of the present invention.

FIG. 6 illustrates a currency bill 60 with an embedded, metallized pattern 62 and preferred hologram that could be used not only for security purposes, but also for tracking of each currency bill. The present invention allows this improvement in currency bill design for enhanced security and tracking because each metallized surface is embedded within a currency bill can be individually and uniquely etched for a unique, individualized, currency bill specific pattern.

Figure 4:
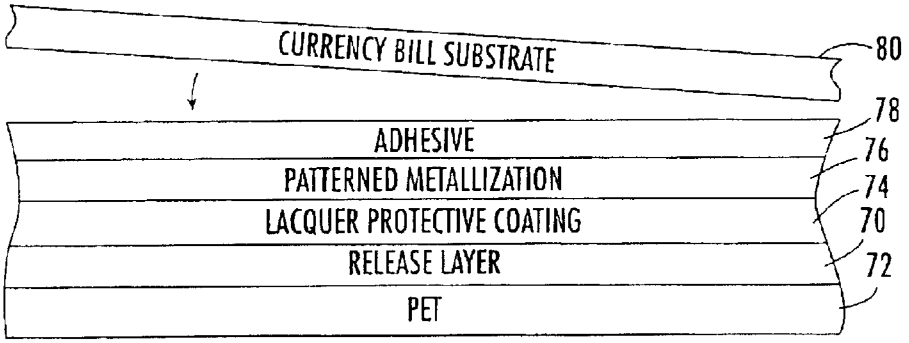
FIG. 4 is a fragmentary, sectional view of the different layers of polymer, release coat, protective coating, and adhesive that engage a substrate for forming an item specific pattern in a metallized layer, such that the release coating is later broken for applying the pattern to a currency bill or other substrate.

FIG. 4 illustrates a sectional view of the intermediate product used in the process for forming a metallized pattern on the substrate, such as the illustrated currency bill of FIG. 6. A release layer 70 is applied onto a polymer base film 72, such as PET or similar material, which could be about 30 to about 70 gauge, and in one non-limiting example, about 42 gauge. The release layer 70 can be a silicon release layer or other similar material used for a release layer or coating. A substantially translucent, protective coating 74, such as a clear lacquer, is applied over the release layer. The holographic pattern may be formed here or could be formed subsequent to the protective coating. It should be understood that the holographic pattern could be the protective coating. The protective coating 74 is then metallized, such as by vacuum metallization, to form a metallized layer (surface) 76 on the protective coating 74. A portion of the metallized surface 76 is demetallized to form an item specific (currency bill specific) pattern by the present invention using either (a) an etchant and ink combination that is forced through the ink jet channels and respective ink jets, which are individually and digitally controlled by the controller, or (b) the application of the etchant-resistant mask followed by etchant application, as described above.

After etching the item specific pattern, an adhesive 78 is applied onto the surface and a substrate (such as a flexible paper used for the currency bill) engages the adhesive in a manner such that the release layer 70 is broken. The protective coating 74 and metallized layer 76 having the item specific pattern is adhesively applied onto the substrate, i.e., currency bill, in the illustrated example. The adhesive could be an adhesive that is activated by applying heat thereto. Because of the reverse nature of the application process, the metallized pattern is applied onto the substrate, i.e., currency bill, and protected by the lacquer protective layer 74. Once the protective coating 74 and metallized layer 76 are applied on the currency bill, it can be further processed with the addition of other protective layers and printed matter, and other materials or layers added as necessary or desired.

Figure 5:
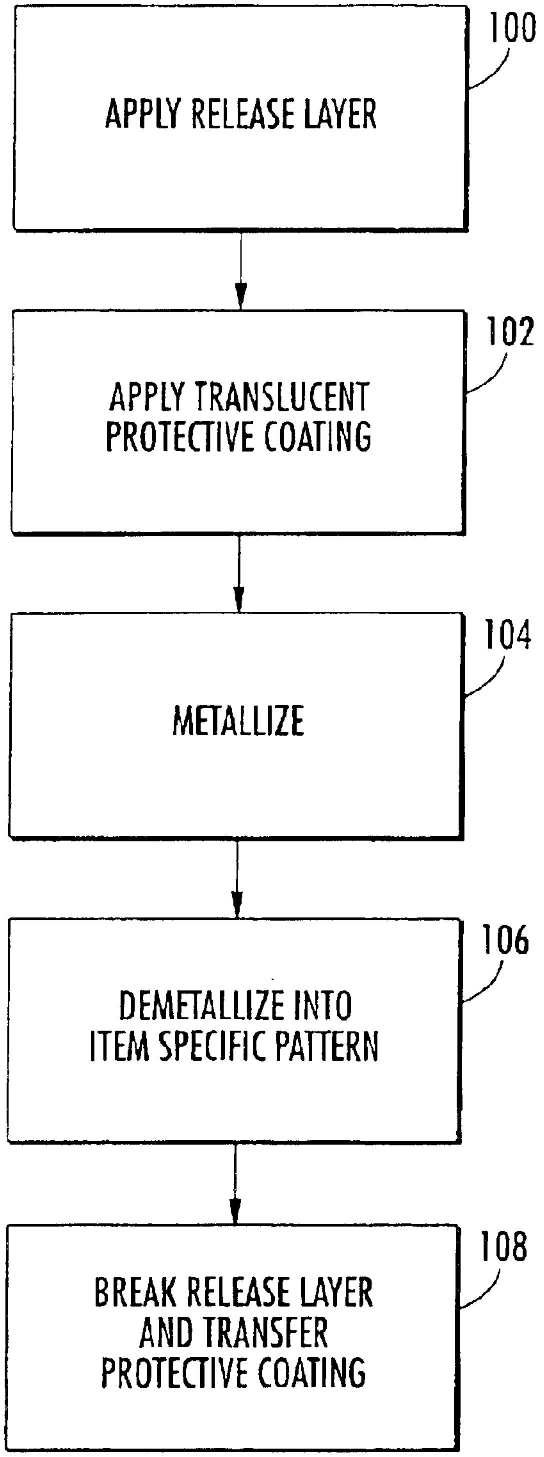
FIG. 5 is a flow chart illustrating the basic steps in a method used for forming a metallized pattern on a substrate, such as a currency bill.

As shown in FIG. 5, a flow chart illustrating the basic steps for forming a currency bill as described as illustrated. A release layer is applied onto the polymer film (block 100). The translucent protective coating is applied over the release layer (block 102). The protective coating is metallized (block 104). The surface is demetallized to form a desired, item specific, i.e., currency bill specific pattern (block 106). This pattern could be a geometric pattern specific to a bill, a series of alphanumeric numbers, enhanced holographic or kinegram images or formed devices, or other information. It is possible the item specific design could be the same pattern for all currency bills, but could be currency bill specific. The adhesive is applied into the patterned metallic surface (block 108). A substrate, such as flexible paper used for currency bills, engages the adhesive to break the release layer and transfer the protective coating and metallized layer onto the currency bill (block 110). In subsequent processing, the currency bill can be further printed or protective coatings applied, and when initially printed as large sheets (and metallization applied thereto) cut into individual currency bills.

It is evident that the present invention advantageously allows a unique and individualized, item specific pattern to be formed during demetallization as noted above. Individual items in a processing sequence can have unique patterns formed on the metallized film by individually and digitally controlling the respective ink jets in the ink jet printhead as noted above.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A currency bill comprising a currency substrate;

a patterned, bill specific metallization layer adhesively applied over a portion of a surface of the currency substrate, wherein the patterned, bill specific metallization layer had been ink jet patterned with an ink having an etchant or etchant-resistant mask and etched to form a bill specific metallization layer having a pattern; and a substantially translucent protective layer that had received the metallization layer thereon.

2. A currency bill according to claim 1, and further comprising a hologram or kinegram formed at the pattern.

3. A currency bill according to claim 1 wherein said metallization layer comprises a vacuum metallized layer.

4. A currency bill according to claim 1 wherein said currency substrate comprises flexible paper.

5. A currency bill according to claim 1 and further comprising an adhesive layer applied over the metallization layer for securing the metallization layer and protective layer onto the currency substrate.

6. A currency bill according to claim 5 wherein said adhesive layer comprises a heat activated adhesive.

7. A currency bill comprising:

a currency substrate; and a pattern, bill specific metallization layer applied over a portion of a surface of the currency substrate and having been etched to form a unique bill specific identification of the bill on which it is applied, wherein the bill specific metallization layer had been inkjet patterned with an ink having an etchant or etchant-resistant mask etched to form a bill specific metallization layer having a pattern.

8. A currency bill according to claim 7 wherein said bill specific identification comprises a unique bill specific pattern formed by etching.

9. A currency bill according to claim 7 wherein said bill specific identification further comprises a hologram or kinegram.

10. A currency bill according to claim 7 and further comprising a substantially translucent protective layer received on the metallization layer.

11. A currency bill according to claim 7 wherein said metallization layer comprises a vacuum metallized layer.

12. A currency bill according to claim 7 wherein said currency substrate comprises flexible paper.

13. A currency bill according to claim 7 and further comprising an adhesive layer applied over the metallization layer for securing the metallization layer onto the currency substrate.

14. A currency bill according to claim 13 wherein said adhesive layer comprises a heat activated adhesive.

15. A currency bill comprising:

a currency substrate; and a bill specific metallization layer adhesively applied on the substrate, said metallization layer having been ink jet patterned with an ink having an etchant-resistant mask, and said metallization layer having been subsequently etched in those areas without mask to form a unique bill specific identification for the bill on which it is applied.

16. A currency bill according to claim 15 wherein said bill specific identification further comprises a hologram or kinegram.

17. A currency bill according to claim 15 and further comprising a substantially translucent protective layer received on the metallization layer.

18. A currency bill according to claim 15 wherein said metallization layer comprises a vacuum metallized layer.

19. A currency bill according to claim 15 wherein said currency substrate comprises flexible paper.

20. A currency bill according to claim 15 and further comprising an adhesive layer applied over the metallization layer for securing the metallization layer onto the currency substrate.

21. A currency bill according to claim 20 wherein said adhesive layer comprises a heat activated adhesive.

* * * * *

UNITED STATES PATENT AND TRADEMARK OFFICE

CERTIFICATE OF CORRECTION

PATENT NO. : 6,817,689 B1
DATED : November 16, 2004
INVENTOR(S) : Annacone

It is certified that error appears in the above-identified patent and that said Letters Patent is hereby corrected as shown below:

Column 4,
Line 38, delete "increase" substitute -- instance --

Signed and Sealed this

Fifteenth Day of February, 2005

JON W. DUDAS
*Director of the United States Patent and Trademark Office*